United States Patent [19]

Ernst

[11] Patent Number: 4,902,543

[45] Date of Patent: Feb. 20, 1990

[54] DISPOSABLE RADIOGRAPHIC ENVELOPE TO RETARD SPREAD OF INFECTION

[76] Inventor: Patricia A. Ernst, P.O. Box 3, Asbury Park, N.J. 07712

[21] Appl. No.: 163,309

[22] Filed: Mar. 2, 1988

[51] Int. Cl.$^4$ .............................................. B32B 22/00
[52] U.S. Cl. .................. 428/35.2; 428/35.7; 428/36.1; 428/483; 428/194
[58] Field of Search ............ 428/34.3, 34.5, 35.7, 428/483, 194, 35.2, 36.1

[56] References Cited

U.S. PATENT DOCUMENTS

| | | | |
|---|---|---|---|
| 4,264,659 | 4/1981 | Patten den | 428/35.2 |
| 4,515,840 | 5/1985 | Gatward | 428/34.3 |
| 4,765,323 | 8/1988 | Poettgen | 428/516 |
| 4,770,911 | 9/1988 | Sengewald . | |

FOREIGN PATENT DOCUMENTS 552392  1/1958  Canada .............................. 428/34.3

*Primary Examiner*—Edith Buffalow
*Attorney, Agent, or Firm*—Charles I. Brodsky

[57] ABSTRACT

The envelope incorporates a pair of sheet materials secured one to another to form a pocket enclosure. Each sheet is comprised of a plastic (e.g. polyethylene) film on one side and a fabric (e.g. polyester) layer on the other side. The two sheets are secured by heat sealing with the plastic sides facing one another and the pocket is dimensioned to accept an available x-ray cassette. In use, the fabric layer of the envelope represents the side that is in contact with the patient being examined.

12 Claims, 1 Drawing Sheet

U.S. Patent      Feb. 20, 1990      4,902,543
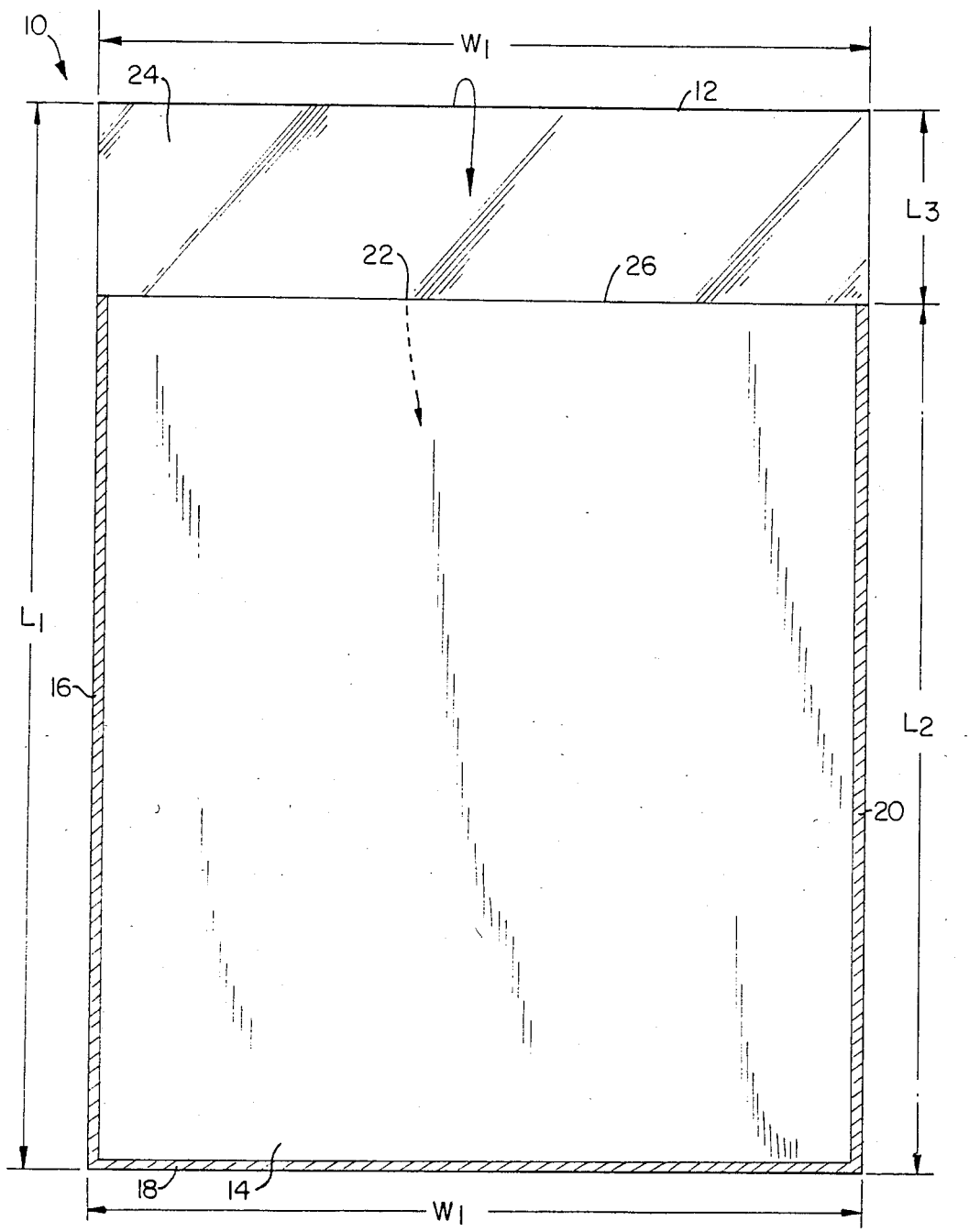
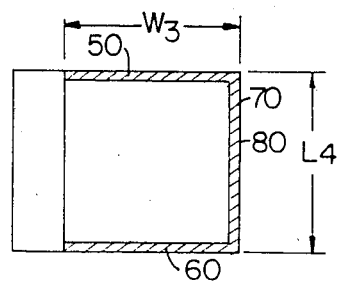

DISPOSABLE RADIOGRAPHIC ENVELOPE TO RETARD SPREAD OF INFECTION

FIELD OF THE INVENTION

The present invention relates to X-ray techniques in diagnosing a patient's condition and, more particularly, to a radiographic envelope to retard the spread of infection through the standard use of x-ray cassettes.

BACKGROUND OF THE INVENTION

As is well known and understood, Acquired Immune Deficiency Syndrome (AIDS) is the most feared disease of our present time—not only because of the lack of understanding as to how it is caused, but also as to the ease with which it is transmitted. Even now, advice is given to avoid such things as simple and subconscious as just shaking hands, as it is believed that AIDS, for example, can be transmitted in just that same manner. Dentists and doctors have been reported to turn-away prospective patients because of the fear of acquiring this disease, and more and more of them have taken to wearing gloves in treating their respective patients.

X-ray technicians have also taken to wearing protective gloves when positioning a patient on the x-ray table, but such gloves are typically removed when developing and working with the x-ray cassette. In many facilities, furthermore, it is not unusual for the cassette to be reused without cleaning, thereby increasing the possibility that any infection—AIDS or otherwise—may be spread.

SUMMARY OF THE INVENTION

As will become clear hereinafter, the radiographic envelope of the present invention incorporates a pair of sheet materials that are secured one to another to form a pocket enclosure into which the x-ray cassette is to be placed. Each sheet will be seen to be composed of a plastic (e.g. polyethylene) film on one side, with a fabric (e.g. polyester) layer on the other side. According to a preferred embodiment of the invention, the two sheets are then secured by heat sealing to form the pocket, with the two plastic sides facing one another. The fabric layer of the envelope so formed, on the other hand, is placed so that when used in x-raying the patient, it is the fabric layer of the envelope that makes the contact with the patient's body. In such manner, any fluids that may be excreted from the patient is trapped by the plastic film from reaching the cassette, and the radiographic envelope is prevented from adhering to the patient's skin by virtue of the fabric layer. The x-ray technician continuing to still wear gloves then merely removes the x-ray cassette from the envelope, which is then to be discarded.

In accordance with a preferred embodiment of the invention, the "sizing" of the two sheets of material are selected to not only accept x-ray cassettes of available dimension, but to overlap one another in forming a "flap" so as to completely enclose the cassette.

As will be appreciated, the envelope of the invention will be seen particularly attractive in emergency room use where patients are oftentimes "bleeding" while they are being x-rayed, such that the envelope serves to eliminate the heretofore reality of the blood—infected or otherwise—from reaching the x-ray cassette. As will also be appreciated, merely using "plastic bags" (as some have suggested) for the cassette envelope is not generally acceptable as the "plastic material" has a very definite tendency of sticking to the patient; alternatively, suggestions of placing the x-ray cassette into a type of "pillow-case" similarly does not represent a solution as the material continues to permit the bodily fluid to pass to the cassette eventually being handled by the technician.

BRIEF DESCRIPTION OF THE DRAWING

These and other features of the invention will be more clearly understood from a consideration of the following description, taken in connection with the single FIGURE of the drawing showing a disposable radiographic envelope constructed in accordance with the present invention.

DETAILED DESCRIPTION OF THE DRAWING

In the drawing, the radiographic envelope is shown by the reference numeral 10, as being fabricated from two sheets of material 12, 14, the sheet 12 having a length $L_1$ which is larger than the length $L_2$ of the sheet 14. Both sheets 12, 14 are selected of the same width $W_1$, and are configured rectangular to accept a rectangular x-ray cassette being used. (Of course, if "square" cassettes were employed, then the particular configuration of the sheets 12, 14 might be modified—just as they might be modified to accept x-ray cassettes of other than "rectangular" or "square" configuration.) As indicated at 16, 18, 20, the two sheets 12, 14 are secured to one another along its sides—by heat sealing, for example—so as to form a pocket enclosure 22. In accordance with a preferred embodiment of the invention, the overlap in length between the sheets 12 and 14 is such as to enable a flap 24 to result, which can then be folded-over along the line 26 in providing a "closed" pocket, the length of the flap 24 being shown by $L_3$.

In accordance with the invention, the radiographic envelope is intended for use with a patient in a manner so that the envelope does not stick to the patient's body. At the same time, the radiographic envelope 10 is constructed so as to prevent body fluids—e.g. perspiration, blood, etc.—from penetrating into the envelope in reaching the x-ray cassette within. To such end, the sheets 12, 14 are to be fabricated such that one side is comprised of a plastic (e.g. polyethylene) film, while the opposite side is composed of a fabric (e.g. polyester) layer. When forming the envelope, it is to be understood that the two sheets of material are secured—as by heat sealing—so that the plastic film sides face one another, inwardly of the pocket 22, and with the fabric layers facing outwardly. Once the x-ray cassette is inserted in the envelope constructed in this manner, the flap 24 is then folded over the line 26, and the envelope then placed under the patient on the x-ray table, with the outer fabric layer being in contact with the patient whose condition is being diagnosed.

In accordance with the teachings herein, an envelope so fabricated has been found to offer the characteristics of preventing the body secretions from reaching the x-ray cassette, with the envelope not sticking to the patient at any time during the x-ray process. One particular construction which proved particularly attractive employed an outside fabric layer of a white polyester material of 18 grams weight, along with an inside clear plastic film of ½ mil thick polyethylene. For the x-ray cassettes being employed, the dimensions $L_1$, $L_2$, $L_3$ and $W_1$ were selected so as to provide three radiographic envelopes—each with a four inch overlapping flap 24, one forming a 17"×18" inside pocket, one forming a 13"×14" inside pocket, and one forming a 16"×20" inside pocket. Any available heat sealing method has been found to work perfectly well in fabricating the envelope as thusly constructed. Manufacturing costs, at the same time, have proven quite small, to the extent that the radiographic envelope, once used, can simply be disposed, and another one then used for the next x-ray exposure to be taken.

While there have been described what are considered to be preferred embodiments of the present invention, it will be readily appreciated by those skilled in the art that modifications can be made without departing from the scope of the teachings herein. For example, it will be readily seen that not only can the "configuration" of the envelope be modified, but so, too, can the sizes be changed, as well as the particular compositions for the plastic and fabric materials making up the sheets employed. Thus, modifications will be apparent where the envelope so formed can be designed with the overlapping flap provided at the "side" of the construction instead of at the "top" (i.e. along the length dimension $L_1$ of the drawing instead of along the width dimension $W_1$), in much the same way that a business envelope exhibits a side sealing flap—and so sized, to accept the cassette in use. As will be seen from the insert of the drawing, the top and bottom edges (50, 60) are secured to the extent of the width $W_3$ indicated, and the side edges 70, 80 are secured along the length $L_4$. For at least such reasons, therefore, resort should be had to the claims appended hereto for a correct understanding of the scope of the invention of using this disposable radiographic envelope to retard the spread of infection by preventing penetration of body fluids to the x-ray cassette, while at the same time permitting the envelope to contact the patient being x-rayed, while not "sticking" to the patient when in use.

I claim:

1. A radiographic envelope comprising:
   first and second sheets of material, with each being provided with a layer impervious to body fluids on one side thereof, with each being secured together with said impervious layers facing, with each being dimensioned to form a pocket enclosure when secured together, and an x-ray cassette within said pocket enclosure.

2. The radiographic envelope of claim 1 wherein said impervious layers include a plastic film composition.

3. The radiographic envelope of claim 2 wherein said impervious layers comprise a polyethylene film.

4. The radiographic envelope of claim 1 wherein each of said first and second sheets of material is also provided with a layer of non-stick fabric on a side opposite to said layers impervious to fluids.

5. The radiographic envelope of claim 4 wherein said layers of nonstick fabric comprise a polyester fabric.

6. The radiographic envelope of claim 1 wherein said first and second sheets of material are selected of a comparable width dimension but of dissimilar length dimensions, and are secured together along three edges thereof.

7. A radiographic envelope comprising:
   a first sheet of rectangular material of length $L_1$ and width $W_1$;
   a second sheet of rectangular material of a different length $L_2$ and of an identical width $W_1$;
   said first sheet of material having a top surface composed of a plastic film impervious to body fluids and a bottom surface composed of a fabric layer;
   said second sheet of material having a top surface composed of a fabric layer and a bottom surface composed of a plastic film impervious to body fluids;
   and means securing the bottom surface of said second sheet of material to the top surface of said first sheet of material;
   with said last mentioned means securing said two surfaces together along a bottom edge of said two sheets of material and along both side edges thereof to form a pocket enclosure;
   and an x-ray cassette within said enclosure.

8. The radiographic envelope of claim 7 wherein the length $L_1$ is greater than the length $L_2$ in permitting formation of an overlapping flap when said sheets of material are secured together.

9. The radiographic envelope of claim 7 wherein said plastic film is composed of a polyethylene composition and wherein said fabric layer is composed of a polyester composition.

10. A radiographic envelope comprising:
    a first sheet of rectangular material of length $L_1$ and width $W_1$;
    a second sheet of rectangular material of identical length $L_1$ and of a different width $W_2$;
    said first sheet of material having a top surface composed of a plastic film impervious to body fluids and a bottom surface composed of a fabric layer;
    said second sheet of material having a top surface composed of a fabric layer and a bottom surface composed of a plastic film impervious to body fluids;
    and means securing the bottom surface of said second sheet of material to the top surface of said first sheet of material;
    with said last mentioned means securing said two surfaces together along one side edge of said two sheets of material and along both bottom and top edges thereof to the extent of the width $W_1$ to form a pocket enclosure;
    and an x-ray cassette within said enclosure.

11. The radiographic envelope of claim 10 wherein the width $W_2$ is greater than the width $W_1$ in permitting formation of an overlapping flap when said sheets of material are secured together.

12. The radiographic envelope of claim 10 wherein said plastic film is composed of a polyethylene composition and wherein said fabric layer is composed of a polyester composition.

* * * * *